(12) United States Patent
Meyer et al.

(10) Patent No.: US 7,972,431 B2
(45) Date of Patent: Jul. 5, 2011

(54) SURFACE-MODIFIED SILICAS

(75) Inventors: Juergen Meyer, Stockstadt (DE); Mario Scholz, Gruendau (DE); Kai Schumacher, Hofheim (DE)

(73) Assignee: Evonik Degussa GmbH, Essen (DE)

( * ) Notice: Subject to any disclaimer, the term of this patent is extended or adjusted under 35 U.S.C. 154(b) by 101 days.

(21) Appl. No.: 12/441,992

(22) PCT Filed: Sep. 11, 2007

(86) PCT No.: PCT/EP2007/059535
§ 371 (c)(1),
(2), (4) Date: Mar. 19, 2009

(87) PCT Pub. No.: WO2008/043635
PCT Pub. Date: Apr. 17, 2008

(65) Prior Publication Data
US 2010/0022694 A1    Jan. 28, 2010

(30) Foreign Application Priority Data
Oct. 13, 2006 (DE) .......... 10 2006 048 508

(51) Int. Cl.
*C04B 14/04* (2006.01)
(52) U.S. Cl. ........ 106/490; 106/482; 524/493; 523/209; 523/216

(58) Field of Classification Search .......... 524/492, 524/493; 523/209, 216; 106/482, 490
See application file for complete search history.

(56) References Cited

U.S. PATENT DOCUMENTS

| | | | |
|---|---|---|---|
| 6,328,944 B1 | 12/2001 | Mangold et al. | |
| 2002/0168524 A1 | 11/2002 | Kerner et al. | |
| 2005/0215668 A1* | 9/2005 | Scholz et al. | 523/216 |
| 2005/0215696 A1 | 9/2005 | Scholz et al. | |
| 2009/0076194 A1* | 3/2009 | Meyer et al. | 523/209 |

FOREIGN PATENT DOCUMENTS

| | | |
|---|---|---|
| WO | 2004 033544 | 4/2004 |
| WO | 2006 053632 | 5/2006 |

* cited by examiner

*Primary Examiner* — David Wu
*Assistant Examiner* — Vu A Nguyen
(74) *Attorney, Agent, or Firm* — Oblon, Spivak, McClelland, Maier & Neustadt, L.L.P.

(57) ABSTRACT

Surface-modified silicas Surface-modified, highly structured, potassium oxide-doped silicas, characterized by BET surface area, $m^2/g$: 25-400 average primary particle size, nm: 5-50 pH: 3-10 carbon content, % by weight: 0.1-10 potassium oxide content, % by weight: 0.000001-40 are prepared by subjecting a potassium oxide-doped silica to surface modification. It can be used as a filler in silicone rubber compositions.

6 Claims, No Drawings

SURFACE-MODIFIED SILICAS

The invention relates to surface-modified, highly structured, potassium oxide-doped, fumed silicas, to a process for preparing them and to their use as filler in silicone rubber compositions.

The preparation of silicone rubber compositions comprising a fumed silica filler doped with potassium by means of aerosol is known (WO 2004/033544 A1).

Also known is the preparation both of HTV and of LSR silicone rubber compositions which comprise a potassium oxide-doped, fumed silicon dioxide as filler (WO 2006/053632 A1).

These known HTV silicone rubber compositions have the disadvantage that their mechanical properties, such as tensile strength, breaking elongation, tear propagation resistance and hardness, and also the optical properties, such as yellowing and transparency, are not of the desired quality.

Similarly, the known LSR silicone rubber compositions, disadvantageously, do not have the desired quality in respect of tensile strength, transparency and viscosity.

The object was therefore to develop a filler for silicone rubber compositions that prevents these disadvantages.

The invention provides surface-modified, highly structured, potassium oxide-doped silicas characterized by

| | |
|---|---|
| BET surface area, m$^2$/g: | 25-400 |
| average primary particle size, nm: | 5-50 |
| pH: | 3-10 |
| carbon content, % by weight: | 0.1-10 |
| potassium oxide content, % by weight: | 0.000001-40 |

The invention further provides a process for preparing the surface-modified, highly structured, potassium oxide-doped silica of the invention, said process being characterized in that a fumed, potassium oxide-doped silica is surface-modified.

The surface modification can be accomplished by spraying the oxides first, where appropriate, with water and then with the surface modifier. Spraying may also take place in the opposite order or simultaneously. The water used may have been acidified with an acid, hydrochloric acid, for example, to a pH of 7 to 1. If two or more surface modifiers are employed, they can be applied together, or separately, in succession or as a mixture.

The surface modifier or modifiers may have been dissolved in suitable solvents. The end of spraying may be followed by mixing for 5 to 30 minutes more.

The mixture is subsequently treated thermally at a temperature of 20 to 400° C. over a period of 0.1 to 6 h. The thermal treatment may take place under inert gas, such as nitrogen, for example.

An alternative method of surface modification of the oxides can be accomplished by treating the oxides with the surface modifier in vapour form and then thermally treating the mixture at a temperature of 50 to 800° C. over a period of 0.1 to 6 h. The thermal treatment may take place under inert gas, such as nitrogen, for example.

The temperature treatment may also take place over a number of stages at different temperatures.

The surface modifier or modifiers can be applied using single-fluid, two-fluid or ultrasound nozzles.

The surface modification can be carried out in heatable mixers and dryers with spraying installations, continuously or batchwise. Suitable apparatus may for example be the following: ploughshare mixers, plate dryers, fluidized-bed dryers or fluid-bed dryers.

Surface modifiers which can be used are all compounds, or mixtures of these compounds, from the following group of compounds:

a) organosilanes of type $(RO)_3Si(C_nH_{2n+1})$ and $(RO)_3Si(C_nH_{2n-1})$
  R=alkyl, such as methyl-, ethyl-, n-propyl-, isopropyl-, butyl-
  n=1-20 b) organosilanes of type $R'_x(RO)_ySi(C_nH_{2n+1})$ and $R'_x(RO)_ySi(C_nH_{2n-1})$
  R=alkyl, such as methyl-, ethyl-, n-propyl-, isopropyl-, butyl-
  R'=alkyl, such as methyl-, ethyl-, n-propyl-, isopropyl-, butyl-
  R'=cycloalkyl
  n=1-20
  x+y=3
  x=1, 2
  y=1, 2 c) haloorganosilanes of type $X_3Si(C_nH_{2n+1})$ and $X_3Si(C_nH_{2n-1})$
  X=Cl, Br
  n=1-20 d) haloorganosilanes of type $X_2(R')Si(C_nH_{2n+1})$ and $X_2(R')Si(C_nH_{2n-1})$
  X=Cl, Br
  R'=alkyl, such as methyl-, ethyl-, n-propyl-, isopropyl-, butyl-
  R'=cycloalkyl
  n=1-20 e) haloorganosilanes of type $X(R')_2Si(C_nH_{2n+1})$ and $X(R')_2Si(C_nH_{2n-1})$
  X=Cl, Br
  R'=alkyl, such as methyl-, ethyl-, n-propyl-, isopropyl-, butyl-
  R'=cycloalkyl
  n=1-20 f) organosilanes of type $(RO)_3Si(CH_2)_m$—R'
  R=alkyl, such as methyl-, ethyl-, propyl-
  m=0.1-20
  R'=methyl-, aryl (for example —$C_6H_5$, substituted phenyl radicals)
  —$C_4F_9$, —$OCF_2$—CHF—$CF_3$, —$C_6F_{13}$, —O—$CF_2$—$CHF_2$
  —$NH_2$, —$N_3$, —SCN, —CH=$CH_2$, —NH—$CH_2$—$CH_2$—$NH_2$,
  —N—$(CH_2$—$CH_2$—$NH_2)_2$
  —OOC($CH_3$)C=$CH_2$
  —O$CH_2$—CH(O)$CH_2$
  —NH—CO—N—CO—$(CH_2)_5$
  —NH—COO—$CH_3$, —NH—COO—$CH_2$—$CH_3$,
  —NH—$(CH_2)_3$Si(OR)$_3$
  —$S_x$—$(CH_2)_3$Si (OR)$_3$
  —SH
  —NR'R"R'"(R'=alkyl, aryl; R"=H, alkyl, aryl; R'"=H, alkyl, aryl, benzyl, $C_2H_4$NR""R'"" with R""==H, alkyl and R""=H, alkyl)

g) organosilanes of type $(R")_x(RO)_ySi(CH_2)_n$—R'
  R"=alkyl x+y=3
  =cycloalkyl x=1, 2
  y=1, 2
  m=0.1 to 20
  R'=methyl-, aryl (for example —$C_6H_5$, substituted phenyl radicals)
  —$C_4F_9$, —$OCF_2$—CHF—$CF_3$, —$C_6F_{13}$, —O—$CF_2$—$CHF_2$ —NH$_2$, —N$_3$, —SCN, —CH=CH$_2$, —NH—CH$_2$—CH$_2$—NH$_2$,
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$
—S$_x$—(CH$_2$)$_3$Si(OR)$_3$
—SH
—NR'R''R''' (R'=alkyl, aryl; R''=H, alkyl, aryl; R'''=H, alkyl, aryl, benzyl, C$_2$H$_4$NR''''R''''' with R''''=H, alkyl and R'''''=H, alkyl)

h) haloorganosilanes of type X$_3$Si(CH$_2$)$_m$—R'
X=Cl, Br
m=0.1-20
R'=methyl-, aryl (for example —C$_6$H$_5$, substituted phenyl radicals)
—C$_4$F$_9$, —OCF$_2$—CHF—CF$_3$, —C$_6$F$_{13}$, —O—CF$_2$—CHF$_2$
—NH$_2$, —N$_3$, —SCN, —CH=CH$_2$,
—NH—CH$_2$—CH$_2$—NH$_2$
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$
—S$_x$—(CH$_2$)$_3$Si(OR)$_3$
—SH i) haloorganosilanes of type (R)X$_2$Si(CH$_2$)$_m$—R'
X=Cl, Br
R=alkyl, such as methyl-, ethyl-, propyl-
m=0.1-20
R=methyl-, aryl (e.g. —C$_6$H$_5$, substituted phenyl radicals)
—C$_4$F$_9$, —OCF$_2$—CHF—CF$_3$, —C$_6$F$_{13}$, —O—CF$_2$—CHF$_2$
—NH$_2$, —N$_3$, —SCN, —CH=CH$_2$, —NH—CH$_2$—CH$_2$—NH$_2$,
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$, it being possible for R to be methyl-, ethyl-, propyl-, butyl-1
—S$_x$—(CH$_2$)$_3$Si(OR)$_3$, it being possible for R to be methyl-, ethyl-, propyl-, butyl-
—SH j) haloorganosilanes of type (R)$_2$XSi(CH$_2$)$_m$—R'
X=Cl, Br
R=alkyl
m=0.1-20
R'=methyl-, aryl (e.g. —C$_6$H$_5$, substituted phenyl radicals)
—C$_4$F$_9$, —OCF$_2$—CHF—CF$_3$, —C$_6$F$_{13}$, —O—CF$_2$—CHF$_2$
—NH$_2$, —N$_3$, —SCN, —CH=CH$_2$, —NH—CH$_2$—CH$_2$—NH$_2$,
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$
—S$_x$—(CH$_2$)$_3$Si(OR)$_3$
—SH k) silazanes of type

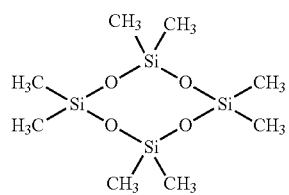

R=alkyl, vinyl, aryl
R'=alkyl, vinyl, aryl l) cyclic polysiloxanes of type D 3, D 4, D 5, with D 3, D 4 and D 5 meaning cyclic polysiloxanes having 3, 4 or 5 units of type —O—Si(CH$_3$)$_2$—. e.g. octamethylcyclotetrasiloxane=D 4 m) polysiloxanes or silicone oils of type

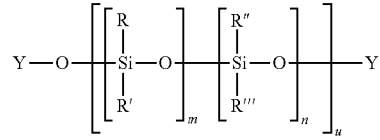

m=0, 1, 2, 3, ... ∞
n=0, 1, 2, 3, ... ∞
u=0, 1, 2, 3, ... ∞
Y=CH$_3$, H, C$_n$H$_{2n+1}$ n=1-20
Y=Si(CH$_3$)$_3$, Si(CH$_3$)$_2$H Si(CH$_3$)$_2$OH, Si(CH$_3$)$_2$(OCH$_3$) Si(CH$_3$)$_2$(C$_n$H$_{2n+1}$) n=1-20
R=alkyl such as C$_n$H$_{2n+1}$, n being 1 to 20, aryl such as phenyl radicals and substituted phenyl radicals, (CH$_2$)$_n$—NH$_2$, H
R'=alkyl such as C$_n$H$_{2n+1}$, n being 1 to 20, aryl such as phenyl radicals and substituted phenyl radicals, (CH$_2$)$_n$—NH$_2$, H
R''=alkyl such as C$_n$H$_{2n+1}$, n being 1 to 20, aryl such as phenyl radicals and substituted phenyl radicals, (CH$_2$)$_n$—NH$_2$, H
R'''=alkyl such as C$_n$H$_{2n+1}$, n being 1 to 20, aryl such as phenyl radicals and substituted phenyl radicals, (CH$_2$)$_n$—NH$_2$, H As surface modifiers it is preferred to use the following silanes:
octyltrimethoxysilane, octyltriethoxysilane, hexamethyldisilazane, 3-methacryloyloxypropyltrimethoxysilane, 3-methacryloyloxypropyltriethoxysilane, hexadecyltrimethoxysilane, hexadecyltriethoxysilane, dimethylpolysiloxane, glycidyloxypropyltrimethoxysilane, glycidyloxypropyltriethoxysilane, nonafluorohexyltrimethoxysilane, tridecafluorooctyltrimethoxysilane, tridecafluorooctyltriethoxysilane, aminopropyltriethoxysilane, hexamethyldisilazane.

With particular preference it is possible to use hexamethyldisilazane, dimethylpolysiloxane, octyltrimethoxysilane and/or octyltriethoxysilane.

As fumed silica doped with potassium oxide it is possible to employ a silica known from DE 10 2005 027 720.9 or PCT/EP 2006/062526 also as mixed potassium oxide-silicon dioxide powder.

In accordance with the invention it is possible to use a mixed potassium oxide-silicon dioxide powder in the form of aggregates of pore-free primary particles containing 0.005%-5% by weight of potassium oxide, the powder having a specific surface area of 100 to 350 m²/g, the specific DBP number, expressed as the DBP number per square metre of specific surface area, being greater than or equal to that of a powder which has only the silicon dioxide component, the potassium oxide being distributed in the core and on the surface of the primary particles in the powder.

By primary particles are meant very small particles which cannot be broken down further without the breaking of chemical bonds.

These primary particles may undergo accretion to form aggregates. The feature of aggregates is that their surface area is smaller than the sum of the surface areas of the primary particles of which they are composed. Furthermore, in the course of dispersing, aggregates are not broken down completely into primary particles.

A mixed oxide powder is a powder in which there is intimate mixing of potassium oxide and silicon dioxide at the level of the primary particles and/or of the aggregates. The primary particles have potassium-O-silicon bonds. There may also be regions of potassium oxide alongside the silicon dioxide in the primary particles.

Pore-free means that no pore volumes can be ascertained in the course of the determination by means of nitrogen. Absence of pores is not to be understood as the inter-aggregate volume that occurs under certain circumstances.

The DBP number (DBP=dibutyl phthalate) is considered to be a measure of the degree of accretion of particles. For the DBP absorption, the force consumption or the torque (in Nm) of the rotating blades of the DBP measuring instrument is measured while defined amounts of DBP are added, comparable to a titration. The higher the DBP number, the higher the degree of accretion of the particles. For the mixed potassium oxide-silicon dioxide powder of the invention, the result is a sharply pronounced maximum with a subsequent drop at a defined level of addition of DBP.

The powder employed in accordance with the invention may have with preference a ratio of a DBP to BET surface area number of at least 1.14 g/m².

The powder employed in accordance with the invention can contain preferably 0.05% to 2% by weight of potassium oxide.

The specific surface area of the powder employed in accordance with the invention embraces values from 100 to 350 m²/g. Preference may be given to BET surface areas of 200±25 m²/g or 300±25 m²/g.

The pH of the powder employed in accordance with the invention, determined in the four percent dispersion in water, can be preferably less than 5. With particular preference the pH can be 3.5 to 4.5.

The potassium oxide-doped, fumed silica can be prepared by producing an aerosol by spraying a solution or dispersion of at least one potassium salt, carrying this aerosol, by means of a stream of carrier gas directed such that it initially impinges laterally to the nozzle on the base of a plate on which the nozzle is mounted, through an externally heated line, and, in so doing, heating it to 100° C. to 120° C., and subsequently mixing the aerosol homogeneously with a gas mixture comprising a silicon compound, a combustion gas and oxygen, the aerosol being supplied to the gas mixture in an amount such that the eventual product contains 0.005% to 5% by weight of the potassium oxide originating from the aerosol, igniting the aerosol-gas mixture and causing it to be consumed by reaction in a flame, and separating the resulting powder from the outgoing gas stream.

The powder which contains only the silicon dioxide component and is employed as a reference to determine the specific DBP number can be prepared by conventionally producing a gas mixture comprising, in homogeneous mixture, an evaporable silicon compound, a combustion gas and oxygen, igniting the gas mixture and causing it to be consumed by reaction in a flame, and separating the resulting powder from the outgoing gas stream.

The concentration of the potassium salt solution used to prepare the aerosol can be preferably 0.5% to 25% by weight.

The surface-modified, highly structured, potassium oxide-doped, fumed silica of the invention can be used as a filler in silicone rubber compositions.

The invention further provides silicone rubber compositions which are characterized in that they comprise the surface-modified, highly structured, potassium oxide-doped silicas of the invention.

The invention further, preferentially provides HTV silicone rubber compositions which are characterized in that they comprise the surface-modified, highly structured, potassium oxide-doped silicas of the invention.

The invention further, preferentially provides LSR silicone rubber compositions which are characterized in that they comprise the surface-modified, highly structured, potassium oxide-doped silicas of the invention.

For elastomer applications, polydimethylsiloxanes are employed that have molecular weights of between 400 000 and 600 000, which are prepared with addition of regulators such as hexamethyl- or divinyltetramethyldisiloxane and which carry corresponding end groups. To improve the vulcanization behaviour and also the tear propagation resistance, vinylmethyldichlorosilane is often added to the reaction mixture in order to build small amounts (<1%) of vinyl groups into the main chain as substituents (VMQ).

HTV silicone rubber means water-clear, high-viscosity self-deliquescing silicone polymers which possess a viscosity of 15-30 kPas for a chain length of around 10 000 SiO units. Further constituents used in the silicone rubber are crosslinkers, fillers, catalysts, colour pigments, non-stick agents, plasticizers and adhesion promoters.

In high-temperature vulcanization the processing temperatures are typically situated in the range of around 140-230° C., whereas low-temperature vulcanization takes place at temperatures of 20-70° C. In respect of vulcanization, a distinction is made between peroxidic crosslinking, addition crosslinking and condensation crosslinking.

The peroxidic crosslinking proceeds via a free-radical reaction mechanism. Under temperature exposure, the peroxides break down into free radicals, which attack the vinyl or methyl groups of the polysiloxanes and there produce new free radicals, which are then attached to other polysiloxane chains and so lead to a three-dimensional crosslinking. The recombination of two free radicals and/or the increasing restriction on chain mobility as the degree of crosslinking grows lead/s to the termination of the crosslinking reaction.

For peroxidic crosslinking, different peroxides are used according to the processing method (for example extrusion, injection moulding, compression moulding) in order to adapt the crosslinking rate to the processing conditions specific to that operation. For instance, very high crosslinking rates are needed for extrusion, whereas the production of moulded articles by injection moulding or compression moulding requires low crosslinking rates, in order to avoid incipient crosslinking in the course of filling of the mould cavity.

The nature of the peroxide used has consequences for the structure and hence for the physical properties of the vulcanisate as well. Diaroyl peroxides (bis(2,4-dichlorobenzoyl) peroxide, dibenzoyl peroxide) crosslink not only vinyl but also methyl groups. With dialkyl peroxides (dicumyl peroxide, 2,5-di(tert-butylperoxy)-2,5-dimethylhexane), in contrast, the crosslinking that occurs is almost exclusively vinyl-specific.

The Shore hardness of the vulcanisate can be controlled to a certain degree via the amount of peroxide in the mixture. As the amount of peroxide goes up, there is an increase in the Shore hardness, as a result of the higher density of crosslinking sites. An overdose of peroxide, however, leads to a decrease in breaking elongation, tensile strength and tear propagation resistance. Depending on application, peroxidic crosslinking necessitates subsequent heat treatment of the vulcanisates in order to reduce the compression set and to remove the cleavage products of the peroxides. As well as the typically aromatic odour that occurs in particular with dicumyl peroxide, the cleavage products may also be detrimental to the physical properties of the vulcanisate (for example reversion in the case of acidic cleavage products).

Fillers divide up into reinforcing and non-reinforcing fillers.

Non-reinforcing fillers are characterized by extremely weak interactions with the silicone polymer. They include chalk, fine quartz powder, diatomaceous earth, mica, kaolin, $Al(OH)_3$ and $Fe_2O_3$. The particle diameters are of the order of magnitude of 0.1 µm. Their functions are to raise the viscosity of the compounds in the non-vulcanized state and to increase the Shore hardness and elasticity modulus of the vulcanized rubbers. In the case of surface-treated fillers, improvements in the tear strength can also be achieved.

Reinforcing fillers are primarily highly disperse silicas with a surface area of >125 $m^2/g$. The reinforcing action is attributable to bonding between filler and silicone polymer. Such bonds are formed between the silanol groups at the surface of the silicas (3-4.5 SiOH groups/$nm^2$) and the silanol groups of the α,ω-dihydroxypolydimethylsiloxanes via hydrogen bonds to the oxygen of the siloxane chain. The consequence of these filler-polymer interactions are increases in viscosity and changes in the glass transition temperature and in the crystallization behaviour. On the other hand, polymer-filler bonds bring about an improvement in the mechanical properties, but may also result in premature crepe hardening of the rubbers.

A position midway between reinforcing and non-reinforcing fillers is occupied by talc. In addition, fillers are utilized for particular effects. They include iron oxide, zirconium oxide or barium zirconate for increasing the heat stability.

Further constituents of silicone rubbers may include catalysts, crosslinking agents, colour pigments, non-stick agents, plasticizers and adhesion promoters.

Plasticizers are required in particular in order to set a low elasticity modulus. Internal adhesion promoters are based on functional silanes which are able to interact on the one hand with the substrate and on the other hand with the crosslinking silicone polymer (principal use in RTV-1 rubbers).

Premature crepe hardening is countered by low molecular mass or monomeric, silanol-rich compounds (for example diphenylsilanediol, $H_2O$). They prevent excessive interaction between the silicone polymers and the silanol groups of the filler, by reacting more rapidly with the filler. A corresponding effect can also be achieved by partially covering the filler with trimethylsilyl groups (treatment of filler with methylsilanes).

A further possibility is to modify the siloxane polymer chemically (phenyl polymers, boron-containing polymers) or to blend it with organic polymers (butadiene-styrene copolymers).

Liquid silicone rubber (LSR) is virtually identical to HTV in its molecular structure, but in terms of average molecular chain length is situated lower by a factor of 6, which means that its viscosity is lower by a factor of 1000 (20-40 Pas). At the disposal of the processor are two components (A and B) in equal amounts, which already include the fillers, vulcanizing agents and, where appropriate, other additives.

Fillers used are the same silicas and additives as in HTV mixtures. The low viscosity of the initial polymer necessitates particularly intense incorporation and mixing, in specially developed mixing assemblies, in order to obtain homogeneous distribution. To facilitate the incorporation of the filler and in order to avoid crepe hardening, the silica is rendered fully hydrophobic—mostly in situ during the mixing operation and by means of hexamethyldisilazane (HMDS, alternatively HMDZ).

The vulcanization of LSR mixtures is accomplished by hydrosilylation, in other words by addition of methylhydrosiloxanes (having at least 3 SiH groups in the molecule) to the vinyl group of the polymer, with catalysis by ppm amounts of Pt(0) complexes, the crosslinker and catalyst being in the separate components as supplied. Specific inhibitors, 1-ethynyl-1-cyclohexanol for example, prevent premature onset of vulcanization after the components have been mixed, and at room temperature produce a dropping time of approximately 3 days. The conditions can be regulated across a considerable range by the concentration of platinum and of inhibitor.

Increasingly, LSR mixtures are being considered for the production of electrically conductive silicone rubber products, since the addition crosslinking, in contrast to the peroxide vulcanization typical of HTV, is not disrupted by furnace blacks (HTV mixtures operate preferably with acetylene black). Conductive furnace blacks are also easier to incorporate and disperse than graphite or metal powders, with silver being preferred.

The silicone rubber compositions of the invention have the following advantages:

In accordance with the invention the HTV silicone rubber compositions filled with the silica of the invention exhibit significantly enhanced mechanical properties.

Thus it has been possible to produce significant enhancements in the tensile strength, breaking elongation, tear propagation resistance and hardness.

It has also been possible to enhance significantly the optical properties of the silicone rubber compositions.

Thus reductions have been achievable in yellowing, and increases in lightness of colour and in transparency.

For the LSR silicone rubber compositions as well it has been possible to enhance the mechanical properties. The tensile strength, for instance, has been increaseable.

Moreover, the transparency has been enhanced. The viscosity has been able to be lowered.

The HTV and LSR silicone rubber compositions of the invention can be used in numerous branches of industry. Not only in car making and aircraft construction but also in energy supply or in instrument manufacture or as sports products it is possible to use HTV and LSR silicone rubber compositions in the form of seals, hoses, profiles, coatings on fabrics, O-rings, teats or keypads.

EXAMPLES

The BET surface area is determined in accordance with DIN 66131.

The loss on drying is determined at 2 h and 105° C., in a method based on DIN/ISO 787/II, ASTM D 280, JIS K 5101/21).

The dibutyl phthalate absorption is measured using a RHEOCORD 90 instrument from Haake, Karlsruhe (DE). For this purpose, 16 g of the silicon dioxide powder are introduced to an accuracy of 0.001 g into a kneading chamber, which is sealed with a lid and has dibutyl phthalate metered into it, via a hole in the lid, at a predetermined metering rate of 0.0667 ml/s. The kneader is operated with a motor speed of 125 revolutions per minute. When the maximum torque is reached, the kneader and the DBP feed are shut off automatically. The DBP absorption is calculated from the quantity of DBP consumed and the quantity of particles weighed in at the start, using the following formula:

DBP number (g/100 g)=(consumption of DBP in g/initial mass of particles in g)×100.

Example P-1

Comparative Example (=Example 3 of WO 2006/053632) is carried out as described in DE 196 50 500. 4.44 kg/h $SiCl_4$ are vaporized and transferred into the central pipe of the burner. This pipe is fed additionally with 2.5 $Nm^3/h$ hydrogen and 7 $Nm^3/h$ air. This gas mixture flows out of the inner burner nozzle and burns in the burner chamber of a water-cooled flame tube. In order to avoid instances of caking, the jacket nozzle, which surrounds the central nozzle, is fed with an additional 0.3 $Nm^3/h$ secondary hydrogen and 0.2 $Nm^3/h$ nitrogen. From the ambient environment, an additional 45 $Nm^3/h$ air are drawn into the flame tube, which is under slight reduced pressure.

The aerosol is prepared from a 2.48 percent strength, aqueous potassium chloride solution by means of ultrasonic atomization with an atomization output of 204 g/h aerosol. The aerosol is carried from the vessel by means of a stream of carrier gas (air) of 3.5 $Nm^3/h$, which is passed into the gas space of the potassium chloride solution vessel, and, while being passed through externally heated lines, is heated to 160° C. Thereafter the aerosol leaves the inner nozzle and is mixed homogeneously with the gas mixture of silicon tetrachloride, hydrogen and oxygen. After the flame hydrolysis, the reaction gases and the resulting powder are drawn through a cooling system by the application of a reduced pressure, in the course of which the particle-gas stream is cooled to about 100 to 160° C. The solid is separated from the outgoing gas stream in a filter or cyclone. In a further step, at temperatures between 400 and 700° C., adhering residues of hydrochloric acid are removed from the silicon dioxide powder by treatment with air containing water vapour. The resulting powder is obtained as a white, finely divided powder P-1.

Example P-2

Comparative Example (=Example 4 of WO 2006/053632) is carried out in the same way as Example 1. The altered quantities of feedstocks and settings are given in Table 1.

Example P-3

Inventively Employed Silica 85 kg/h $SiCl_4$ are vaporized and transferred into the central pipe of the burner as described in DE-A-19650500. This pipe is fed additionally with 40 $Nm^3/h$ hydrogen and 124 $Nm^3/h$ air. This gas mixture flows out of the inner burner nozzle and burns in the burner chamber of a water-cooled flame tube. In order to avoid instances of caking, the jacket nozzle, which surrounds the central nozzle, is fed with an additional 4 $Nm^3/h$ secondary hydrogen.

The aerosol is obtained from a 5 percent strength, aqueous potassium chloride solution by means of a two-fluid nozzle mounted on the base of the vessel.

1100 g/h aerosol are produced. The aerosol is carried by means of a stream of carrier gas (air) of 18 $Nm^3/h$, which is directed such that it initially impinges laterally to the two-fluid nozzle on the base of a plate on which the two-fluid nozzle is mounted, and, while being passed through an externally heated line, is heated to 120° C. Thereafter the aerosol/carrier gas mixture leaves the inner nozzle and is mixed homogeneously with the gas mixture of silicon tetrachloride, hydrogen and oxygen. After the flame hydrolysis, the reaction gases and the resulting powder are drawn through a cooling system by the application of a reduced pressure, in the course of which the particle-gas stream is cooled to about 100 to 160° C. The solid is separated from the outgoing gas stream in a filter or cyclone. In a further step, at temperatures between 400 and 700° C., adhering residues of hydrochloric acid are removed from the silicon dioxide powder by treatment with air containing water vapour. The resulting powder is obtained as a white, finely divided powder.

Examples P-4 to P-8 are carried out in the same way as Example P-3. The altered quantities of feedstocks and settings are given in Table 1.

The analytical data of the powders of Examples 1 to 8 are likewise given in Table 1.

The powder employed in accordance with the invention differs from other powders primarily in the higher degree of accretion of the aggregates. This is clearly apparent, for example, from the TEM micrographs of a silicon dioxide powder, Aerosil® 300 from Degussa, and of the powder P-6 employed in accordance with the invention. Moreover, the pH of the powders employed in accordance with the invention is lower than in the mixed alkali metal oxide powders.

Furthermore, the powder employed in accordance with the invention has a primary particle diameter distribution, defined as $d_n/d_a$, of less than 0.7, $d_a$ being the mean, number-based primary particle diameter and $d_a$ being the mean primary particle diameter averaged over the surface.

The examples further show that the nature of the aerosol generation and the aerosol temperature are critical to being able to obtain the powder employed in accordance with the invention.

TABLE 1

Feedstock materials, feedstock quantities and analytical values

| | | Comparative | | Inventively employed powders | | | | | |
|---|---|---|---|---|---|---|---|---|---|
| | | P-1 | P-2 | P-3 | P-4 | P-5 | P-6 | P-7 | P-8 |
| SiCl$_4$ | kg/h | 4.44 | 4.44 | 85 | 85 | 85 | 85 | 85 | 85 |
| Primary air | Nm$^3$/h | 7.0 | 6.7 | 124 | 139 | 135 | 140 | 76 | 132 |
| Primary H$_2$ | Nm$^3$/h | 2.5 | 2.0 | 40 | 40 | 40 | 40 | 43 | 40 |
| Lambda core | | 1.17 | 1.40 | 1.3 | 1.45 | 1.41 | 1.46 | 1.41 | 1.38 |
| Gamma core | | 2.13 | 1.71 | 1.78 | 1.78 | 1.78 | 1.78 | 1.92 | 1.78 |
| Secondary H$_2$ | Nm$^3$/h | 0.3 | 0.3 | 4 | 4 | 4 | 4 | 4 | 4 |
| Metal salt solution | | KCl | KCl | KCl | KCl | KCl | KCl | AlCl$_3$ | NaCl |
| Concentration | g/l | 2.48 | 2.48 | 5 | 2.5 | 1 | 5 | 1.5 | 5 |
| Amount | g/h | 204 | 246 | 1100 | 1050 | 1030 | 1100 | 10.35 | 968 |
| Carrier gas (air) | Nm$^3$/h | 3.5 | 3.5 | 18 | 18 | 18 | 18 | 18 | 18 |
| Aerosol temperature | °C. | 160 | 160 | 120 | 112 | 118 | 115 | 116 | 125 |
| Mixed oxide component | | K$_2$O | K$_2$O | K$_2$O | K$_2$O | K$_2$O | K$_2$O | Al$_2$O$_3$ | Na$_2$O |
| Amount | % by wt. | 0.15 | 0.18 | 0.12 | 0.06 | 0.02 | 0.11 | 0.17 | 0.09 |
| BET surface area | m$^2$/g | 208 | 324 | 216 | 317 | 308 | 317 | 130 | 293 |
| DBP number | g/100 g | 234 | 305 | 326 | 362 | 370 | 372 | 155 | 380 |
| DBP number/BET | g/m$^2$ | 1.125 | 0.94 | 1.5 | 1.14 | 1.2 | 1.17 | 1.19 | 1.3 |
| $d_n/d_a$*) | | >0.7 | >0.7 | 0.69 | 0.63 | 0.69 | 0.63 | — | 0.55 |
| pH of 4% dispersion | | 6.66 | 6.35 | 4.1 | 4.4 | 4.2 | 4.5 | 4.4 | 4.6 |

*) $d_n$ arithmetic particle diameter, $d_a$ averaged particle diameter

Preparation of the Inventive Silica

A mixer is charged with 3.0 kg of silica and, with intense mixing, the silica is first sprayed where appropriate with water or with dilute hydrochloric acid and subsequently with the surface modifier. After spraying has ended, mixing is continued for 15 minutes and is followed by heat treatment.

In some cases the heat treatment takes place in two stages at different temperatures.

Further details are set out in Table 2.

Comparative Examples

The comparative examples conform to WO 2006/053632. The assignment is as follows:

Comparative Example 1 corresponds to Example 5 from WO 2006/053632.

Comparative Example 2 corresponds to Example 6 from WO 2006/053632.

TABLE 2

Preparation of the inventive examples and comparative examples

| Designation | Oxide | SM** | Parts SM**/ 100 parts oxide | Parts H$_2$O/ 100 parts oxide | Heat treatment temperature stage 1/ stage 2 [°C.] | Heat treatment time stage 1/ stage 2 [h] |
|---|---|---|---|---|---|---|
| Comparative Example 1 | P-1 | A | 12 | 5 | 25/120 | 5/2 |
| Comparative Example 2 | P-2 | A | 18 | 5 | 25/120 | 5/2 |
| Inventive Example 1 | P-3 | A | 12 | — | 140/— | 3/— |
| Inventive Example 2 | P-4 | A | 13 | 5 | 140/— | 3/— |
| Inventive Example 3 | P-5 | A | 11.5 | 5 | 140/— | 3/— |
| Inventive Example 4 | P-3 | B | 21 | — | 380/— | 1/— |
| Inventive Example 5 | P-4 | B | 29 | — | 380/— | 1/— |
| Inventive Example 6 | P-3 | C | 18 | 5*** | 160/— | 2/— |
| Inventive Example 7 | P-5 | C | 25 | 7.5 | 160/— | 2/— |
| Inventive Example 8 | P-3 | D | 20 | 5 | 160/— | 2/— |

**SM = surface modifier reagent:
A = hexamethyldisilazane
B = dimethylpolysiloxane
C = octyltrimethoxysilane
D = octyltriethoxysilane
***water was replaced by 0.01N hydrochloric acid

TABLE 3

Physicochemical data of the inventive and comparative silicas

| Designation | Tapped density [g/l] | Loss on drying [%] | Loss on ignition [%] | pH | C content [%] | K content (calculated as $K_2O$) [wt. %] | BET specific surface area [$m^2/g$] |
|---|---|---|---|---|---|---|---|
| Comparative Example 1 | 38 | 0.8 | 2.6 | 9.1 | 2.3 | 0.15 | 163 |
| Comparative Example 2 | 40 | 1.2 | 4.6 | 9.0 | 3.9 | 0.180 | 232 |
| Inventive Example 1 | 51 | 0.7 | 2.3 | 6.7 | 2.2 | 0.070 | 181 |
| Inventive Example 2 | 54 | 0.6 | 4.6 | 6.7 | 3.7 | 0.040 | 231 |
| Inventive Example 3 | 58 | 0.7 | 4.1 | 5.5 | 3.7 | 0.014 | 240 |
| Inventive Example 4 | 55 | 0.5 | 5.1 | 5.0 | 4.9 | 0.112 | 140 |
| Inventive Example 5 | 63 | 0.4 | 7.0 | 4.8 | 6.5 | 0.058 | 251 |
| Inventive Example 6 | 64 | 0.2 | 7.5 | 5.2 | 6.1 | 0.105 | 152 |
| Inventive Example 7 | 55 | 0.6 | 10.8 | 5.0 | 8.9 | 0.020 | 240 |
| Inventive Example 8 | 60 | 0.4 | 7.8 | 5.4 | 6.2 | 0.12 | 149 |

Use of the Inventive Silicas in Silicone Rubber

The results of performance testing of the silica of the invention in silicone rubber show advantages for the silicas of Inventive Example 1 as compared with the silica of Comparative Example 1.

This is evident from the following results:

A. HTV Silicone Rubber

HTV Silicone Rubber Process:

400 g of silicone polymer are applied to a double-roll mill. As soon as a homogeneous roll sheet has formed on the server roll (the faster-running roll), the filler (160 g) can be added. The silica is added slowly and in portions between the two rolls. After about 50% of the filler has been added, the compound is taken from the roll using a scraper, and turned. Thereafter the remaining 50% of the filler amount is added.

In order to disperse and homogenize the silica, rolling is continued for 5 minutes after the filler has been incorporated. In the course of this rolling the mixture is turned a further 5 times. The mixtures prepared in this way are stored for 1 week for afterwetting of the silica.

Following storage, the compound is plastified by mixing on a roller mill until a homogeneous sheet is produced. Then the amount of peroxide weighed out beforehand is metered in, using a spatula. Rolling is continued for 8 minutes in order to disperse and homogenize the peroxide, the mixture being taken from the roll with the scraper, and turned, 8 times. Once again, storage takes place at room temperature for 24 hours (appropriately in PE film).

Prior to vulcanization, the compound is again plastified on the double-roll mill. The heating press is preheated to 140° C. Between the chrome-plated steel plates, 4 silicone plates are vulcanized with 2 mm (pressing time 7 min, 4*50 g compound) and 1 silicone plate is vulcanized with 6 mm (pressing time 10 min, 120 g compound).

In order to remove cleavage products of the peroxide, the plates are post-vulcanized in a hot-air oven at 200° C. for 6 hours. The test specimens required are cut from the vulcanisates using the appropriate punches and are stored under standard conditions.

TABLE

Mechanical properties

| Silica | Tensile strength [$N/mm^2$] | Breaking elongation [%] | Tear propagation resistance [N/mm] | Hardness [Shore A] |
|---|---|---|---|---|
| Comparative Example 1 | 6.5 | 305 | 22 | 43 |
| Inventive Example 1 | 8.7 | 475 | 29 | 52 |

TABLE

Optical properties

| Silica | Yellowing | Lightness of colour | Transparency [DE/D65] |
|---|---|---|---|
| Comparative Example 1 | 42 | 62 | 30 |
| Inventive Example 1 | 28 | 75 | 36 |

The inventive silica of Example 1 has significantly improved mechanical properties as compared with the silica of Comparative Example 1, in HTV silicone rubber. Thus it was possible, for example, to improve the tensile strength by about 34%, the breaking elongation by about 56%, the tear propagation resistance by about 32% and the hardness by about 21%. As well as the mechanical properties, however, the optical properties as well were improved, enormously. Thus the yellowing was lowered by about 43% while the lightness of colour was raised by about 21% and the transparency by about 20%.

B. LSR Silicone Rubber

Process: LSR Silicone Rubber

In a planetary dissolver, 20% silica is incorporated into organopolysiloxane (Silopren U 10, GE Bayer Silicones) at a slow speed (50/500 $min^{-1}$ planetary mixer/dissolver disc).

As soon as the silica is fully wetted, a vacuum of approximately 200 mbar is applied and dispersion is carried out for 30 minutes at 100 rpm of the planetary stirrer and 2000 rpm of the dissolver (cooling with mains water). After cooling, the base mixture can be crosslinked.

Following incorporation, the mixture forms a fluid mass of low viscosity. After the 30-minute dispersing there is somewhat of a reduction in the viscosity.

340 g of the base mixture are weighed out into a stainless steel beaker. Weighed out into the mixture in succession are 6.00 g of inhibitor (2% purity ECH in silicone polymer U 1) and 0.67 g of platinum catalyst solution and 4.19 g of Silopren U 730, and the mixture is homogenized at a speed of n=500 rpm and deaerated.

Vulcanization of the Formulations

For the vulcanization of the 2 mm vulcanisates, 4*50 g or 2*100 g of the mixture are needed. The plates are then pressed in the press for 10 minutes at a pressure of 100 bar and a temperature of 120° C. For the vulcanization of the 6 mm vulcanisates, 120 g of the mixture are needed. In the press the plates are pressed for 12 minutes at a pressure of 100 bar and a temperature of 120° C. Thereafter the vulcanisates are post-vulcanized in an oven at 200° C. for 4 hours.

TABLE

Mechanical properties

| Silica | Tensile strength [N/mm²] | Breaking elongation [%] | Tear propagation resistance [N/mm] | Hardness [Shore A] | Rebound elasticity [%] |
| --- | --- | --- | --- | --- | --- |
| Comp. Ex. 1 | 3.9 | 244 | 13 | 48 | 62 |
| Inv. Ex. 1 | 5.5 | 320 | 17 | 50 | 63 |

TABLE

Optical properties

| Silica | Transparency [DE/D65] |
| --- | --- |
| Comparative Example 1 | 35 |
| Inventive Example 1 | 37 |

TABLE

Rheological properties

| Silica | Yield point [Pa] | Viscosity [Pas] D = 10 s⁻¹ |
| --- | --- | --- |
| Comparative Example 1 | 0 | 270 |
| Inventive Example 1 | 20 | 185 |

Inventive Example 1 displays significantly enhanced mechanical properties as compared with Comparative Example 1, in LSR silicone rubber. An increase was possible in particular in the tensile strength, by around 40%. The transparency, too, was enhanced. Moreover, surprisingly, it proved possible additionally to these enhancements to lower the viscosity by about 31%.

The invention claimed is:

1. A surface-modified, potassium oxide-doped, fumed silica, comprising:
    0.000001-40% by weight of potassium oxide;
    wherein
    a BET surface area is 25 to 400 m²/g,
    an average primary particle size is 5 to 50 nm,
    a carbon content is 0.1 to 10% by weight,
    and wherein the surface modified potassium oxide doped fumed silica is obtained by surface modification of a potassium oxide doped fumed silica having a pH of a 4% aqueous dispersion in water of less than 5,
    a DBP number of greater than 305 g/100 g, and
    a ratio of the DBP number to a BET surface area equal to or greater than 1.14.

2. A silicone rubber composition, comprising: the surface-modified, potassium oxide-doped, fumed silica according to claim 1.

3. A high transparency, high viscosity (HTV) silicone rubber, comprising: the surface-modified, potassium oxide-doped, fumed silica according to claim 1.

4. A liquid silicone rubber (LSR), comprising: the surface-modified, potassium oxide-doped, fumed silica according to claim 1.

5. The surface modified, potassium oxide-doped, fumed silica according to claim 1, wherein a ratio of a mean number-based primary particle diameter to a mean primary particle diameter averaged over a surface ($d_n/d_a$) of the potassium oxide doped fumed silica is less than 0.7.

6. The surface modified, potassium oxide-doped, fumed silica according to claim 1, wherein the potassium oxide-doped, fumed silica is in the form of aggregates of pore-free primary particles as ascertained by nitrogen absorption.

* * * * *